INVENTORS
Arthur K. Littwin
Robert L. Littwin
BY Paul H. Gallagher
Atty.

United States Patent Office 3,445,620
Patented May 20, 1969

3,445,620
APPARATUS FOR AND METHOD OF DEMAGNETIZING
Arthur K. Littwin, Lincolnwood, and Robert L. Littwin, Park Ridge, Ill., assignors to Arthur K. Littwin, Robert L. Littwin, Donald F. Littwin and Horace A. Young, Chicago, Ill., as trustees under trust known as Littwin Family Trust No. 1
Filed May 18, 1965, Ser. No. 456,740
Int. Cl. B23k 9/10, 11/04, 11/24
U.S. Cl. 219—108               31 Claims

ABSTRACT OF THE DISCLOSURE

Demagnetizing in connection with AC welding, the same AC passing through the welding electrodes and the workpiece which was magnetized in the welding operation, and in the half-cycle opposite that in which the welding step was terminated.

---

The present invention relates to apparatus for and method of demagnetizing.

The invention has particular adaptability to welding operations. In a welding operation the high currents in the electrodes produce intense magnetic fields and the workpieces being welded become magnetized; in many instances the degree of such magnetization is extremely great because of the high currents involved. There are many operations, subsequent to the welding, involving the workpieces in which that magnetization is a great disadvantage, as is well known.

A broad object of the present invention is to provide novel apparatus for and method of demagnetizing workpieces in connection with a welding operation in which they become magnetized.

A further broad object is to provide such apparatus and method which utilizes the physical parts of the welding machine, and specifically the electrodes thereof, in demagnetizing the workpieces in direct association with the welding operation.

The present invention is most efficient in connection with production line operations in which workpieces are welded successively in certain predetermined time cycles. In such welding operations the portion of the time cycle in which the welding step is performed, i.e., in which the welding current is impressed on the workpiece, is relatively short compared with the complete cycle. The remainder of the cycle includes such steps as mechanically and physically moving the workpieces to welding position, moving the electrodes into engagement with the workpieces, removing the electrodes from the workpieces, moving the workpieces away from the welding position, etc. The complete time cycle may occupy for example 1½ seconds while the step in which the welding current is imposed on the workpiece may occupy for example 9/10 second. The demagnetizing step of the present invention occupies a small interval of time, such as a fraction of a second, this interval varying, depending upon several factors.

Another principal object of the present invention therefore is to provide apparatus for and method of demagnetizing for use in conjunction with welding apparatus in which the welding apparatus is utilized in a production line in a recurrent cyclng operation, and further in which the demagnetizing step does not interfere with the welding cycle as determined by other factors not associated with the demagnetizing.

Still another object is to provide demagnetizing apparatus and method of the foregoing character for use in conjunction with a welding operation in which the controls incorporated in the welding apparatus are utilized for controlling the demagnetizing apparatus.

A further object is to provide novel electrical controls for controlling the electrical circuit of a welding apparatus for performing an actual demagnetizing operation.

Still another object is to provide electrical controls for a pair of back-to-back ignitrons arranged for enabling passage of current in both directions in an AC circuit in a welding operation, wherein those controls are effective for utilizing the same ignitrons for progressively diminishing the current, and utilizing it in both directions, for demagnetizing.

Another feature of the invention has to do with the fact that in welding, much higher voltage is required for performing the welding step than for performing the demagnetizing operation. For example, voltage in neighborhood of 440 volts may be necessary for the welding operation while 50 volts for example is sufficient for performing an effective demagnetizing operation. In the welding operation, magnetization reaches its peak value in a shorter interval than that in which the welding is performed and hence a lower voltage value in the demagnetizing step than in the welding step is effective for performing a good demagnetizing operation. It is therefore another object of the invention to provide novel demagnetizing apparatus and method for utilizing welding apparatus for the demagnetizing step, and in so doing utilizing a lower voltage than utilized in the welding step.

Another and important feature of the invention is that a novel ignitron circuit is utilized in the demagnetizing operation whereby to eliminate the use of mechanical contacts and thereby eliminate arcing, with the further advantage of reducing the time required for a switching operation.

Other objects and advantages of the invention will appear from the following detailed description taken in conjunction with the accompanying drawings in which.

Figure 1:
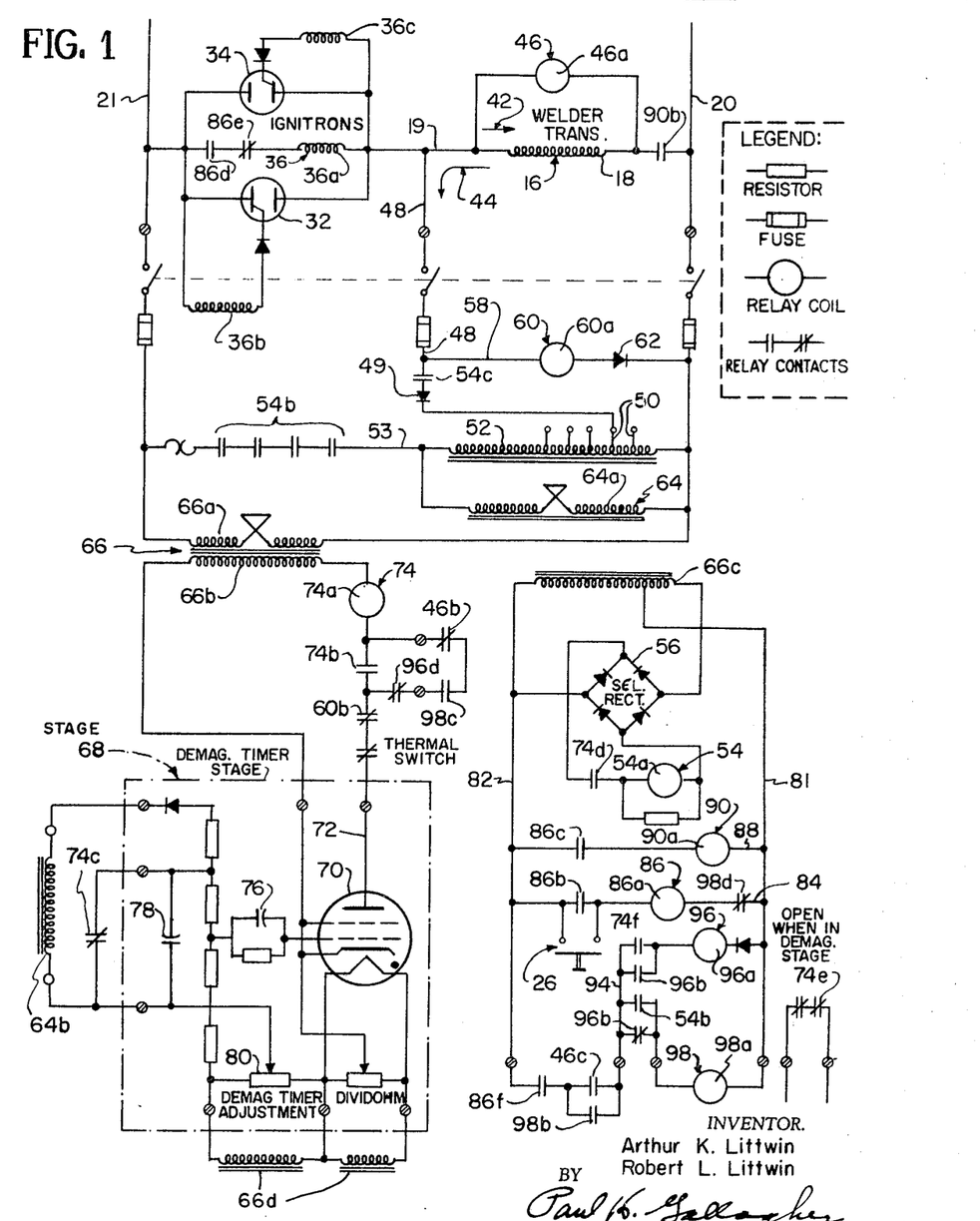
FIGURE 1 is a diagram of the electrical circuit of one embodiment of the invention.
Figure 2:
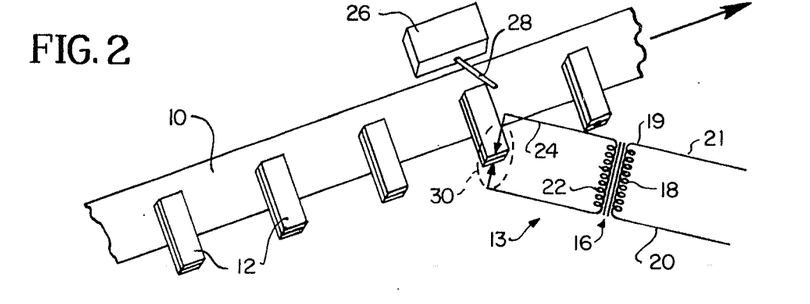
FIGURE 2 is a diagrammatic illustration of a conveyor having workpieces to be welded thereon, and welding apparatus.

Referring now in detail to the drawings, attention is directed first to FIGURE 2 showing a conveyor having a number of workpieces theeron to be welded, and a welding apparatus in conjunction therewith. The conveyor is indicated at 10 and may be of any desired kind and the workpieces to be welded are indicated at 12. The welding apparatus, indicated diagrammatically at 13, includes a transformer 16 having a primary 18 in a conductor 19 (see also FIGURE 1) connected with leads 20 and 21 leading from a suitable AC source which in the present instance is preferably in the neighborhood of 440 volts. The transformer also includes a secondary 22 connected with electrodes 24 which are brought into welding contact engagement with the workpieces 12 in a known manner. The conveyor, the means for driving the conveyor, the workpieces 12 and the welding apparatus 14 are all of known construction. Also of known type are various controls for controlling the drive of the conveyor, moving the electrdes into and out of welding contact engagement with the workpieces and the means for turning on and off the welding apparatus. The conveyor 10 is moved intermittently for carrying the workpieces 12 successively to the welding position and the means for controlling the operation of the conveyor may include a switch 26 arranged for actuation by the workpieces, an actuating finger 28 in the switch being provided for that purpose.

Extremely high current is utilized in the welding operation and as a consequence an intense magnetic field, indicated at 30 is produced with magnetizes the workpieces, this magnetization being that which the apparatus of the present invention is effective for eliminating.

Referring now to the circuit of FIGURE 1, the primary 18 of the welding apparatus is shown connected across the leads 20 and 21 and in series with a pair of back-to-back ignitrons 32 and 34 arranged in a known manner and constituting leading and trailing ignitrons respectively, these also being identified as the first to shut off and last to shut off respectively. The means for controlling the ignitrons, in so far as the welding apparatus is concerned may be of any known type, the present invention being adapted for accommodating such known control arrangement. In the present instance, a transformer 36 is provided having a primary 36a connected parallel with the ignitrons, and secondaries 36b and 36c connected with the ignitors of the respective ignitrons. Energization of the primary 36a in respective half cycles, energizes the secondaries and ignites the ignitrons. Further reference to this control will be made hereinbelow.

In the use of such ignitron arrangement in welding apparatus as heretofore known, the apparatus has always been shut off in the same half cycle of the AC, i.e., since the ignitron 34 is the last to shut off, as referred to above and, in every instance in which it is shut off, the current flows through the primary 18 in the same direction, and in the present instance that indicated by the arrow 42. The demagnetizing current, as explained fully hereinbelow, flows in the opposite direction as indicated by the arrow 44. As brought out fully hereinbelow, the demagnetizing current is applied for an interval only sufficient to perform the intended demagnetizing result.

Connected in parallel with the transformer primary 18 is a coil 46a of a relay 46 controlling certain contacts referred to hereinbelow and identified with the numeral 46 with letter subscripts.

A conductor 48 having a rectifier 49 therein leads from the conductor 19 between the welding transformer 18 and the ignitrons 32, 34 and is selectively connectable with a plurality of tappings 50 of a transformer 52 in a conductor 53 connected across the leads 20 and 21. The conductor 53 has a plurality of contacts 54b of a relay 54 having a coil 54a (lower, right). The coil 54a is incorporated in a DC circuit indicated in its entirety at 56. The relay 54 also includes contacts 54c in the conductor 48 (upper, center). Connected between the conductors 48 and 20 is another conductor 58 including the coil 60a of a safety relay 60, and a rectifier 62.

Also connected across the leads 20 and 21 is the primary 64a of a transformer 64 (center, right) which is also in series with the contacts 54b.

Additionally connected across the leads 20 and 21 is the primary 66a of a transformer 66 which includes a secondary 66b, another secondary 66c (center, right) which provides the source for the DC circuit 56 and an additional secondary 66d (bottom).

The circuit includes a demagnetizing timer stage 68 (lower, left) which includes a secondary 64b (lower, left) of the transformer 64. This demagnetizing timer stage also includes a tube 70 connected with a conductor 72 which includes the coil 74a (center) and holding contacts 74b of a relay 74.

The tube 70 remains normally in conducting condition upon closing of the conductor 72 in the demagnetizing operation and is rendered non-conducting by negative bias provided by the discharge of condensers 76 and 78 thereby terminating the demagnetizing operation. The timing of the discharge of the condensers is controlled by an adjustable resistor 80 (lower, left). The condensers are also under the control of normally closed contacts 74c (lower, left). Other contacts of the relay 74 include 74d (lower, right) controlling the relay 54, and 74e (bottom, right).

The secondary 66c (center, right) is included in the controls of the welding apparatus and provided with conductors 81 and 82 across which is connected a conductor 84 having the switch 26 therein. The switch 26 may be controlled by the conveyor as stated above, or controlled in any suitable manner for initiating the welding cycle. In FIGURE 1 that switch is shown as a hand operated start switch for purposes of representing the initiating of the welding cycle. In the conductor 84 is a timer relay 86 of known kind which upon energization thereof immediately closes certain contacts and after the expiration of predetermined time delay, opens others. The relay 86 includes a coil 86a, normally open holding contacts 86b, normally open contacts 86c (lower, right) in a conductor 88 connected across the leads 81 and 82. The conductor 88 also includes the coil 90a of a relay 90, the latter controlling contacts 90b (top, right) in the conductor 19. Also included in the relay 86 are normally open contacts 86d (top, left) in the ignitron controls and normally closed contacts 86e in series therewith and in series with the transformer 36. After the expiration of the time delay mentioned in connection with the relay 86, the contacts 86e are opened. This timer relay 86, also herein designated a welder timer, initiates the welding cycle which is terminated by other controls as described hereinbelow. The welding timer 86 is energized once for each welding cycle of the apparatus.

Upon energization of the welder timer 86 as referred to, and consequent closure of the contacts 86d and contacts 90b, circuit is closed through the conductor 19, the transformer and ignitron control and the welding operation commences, the completion of the circuit through the conductor 19 and contacts 86d and 86e energizes the transformer primary 36a which in turn energizes the secondaries 36b and 36c in alternate half-cycles of the AC, which in turn renders the ignitrons conducting in the corresponding half-cycles and establishes welding current through the transformer primary 18 for the welding operation. Upon expiration of the predetermined time delay of the welder timer 86 (lower, right), as referred to, and consequent opening of the contacts 86e, the welding step of the overall cycle comes to an end and the demagnetizing portion of the cycle begins.

Completion of the circuit through the conductor 19 (top) also energizes the coil 46a, opening contacts 46b (center) and closing the contacts 46c (bottom, right). The latter contacts are in a conductor 94 connected between the leads 81 and 82 and includes the coil 96a of an auxiliary relay 96 which also includes normally closed contacts 96b (lower, right). Closure of contacts 46c (bottom, right) with previous closure of the contacts 76d completes circuit through contacts 96b and energizes the coil 98a of a relay 98. This coil then closes holding contacts 98b (lower, right) as well as contacts 98c (center). This relay 98 is a timer relay similar to the relay 86, having a characteristic time delay after which certain contacts are actuated.

The sequence of the operation of welding and demagnetizing steps is as follows: the overall cycle is initiated by closing the switch 26 (lower, right) which energizes the welder timer 86. This timer or relay closes its holding contacts 86b and the contacts 86d (top, left) in the ignitron controls; it closes the contacts 86c (lower, right) which energizes the relay coil 90a which closes the contacts 90b which then completes the circuit through the conductor 19 and the welding cycle is initiated. Upon expiration of the time delay characteristic of the welder timer 86, the contacts 86e (top, left) in the ignitron controls are opened and this extinguishes the ignitron and terminates the welding portion of the overall cycle.

After the welding step has been terminated, the coil 46a (top right) becomes de-energized permitting the contacts 46b (center) to close; this closes circuit through a bypass circuit for the conductor 72, the contacts 98c having been previously closed upon energization of the coil 98a (bottom, right) as explained above. Thus the demagnetizing relay 74 is energized and it closes its holding contacts 74b. This also opens the contacts 74c (lower, left) and permits the negative bias to be imposed on the tube 70, as explained above for the purpose of timing the demagnetizing step. Energization of the coil 74a also closes the contacts 74d (lower, right) which energizes the coil 54a which in turn closes contact 54b (upper, left) and 54c (upper, center). Closure of the latter two sets of contacts establishes the demagnetizing circuit i.e., from the lead 20 (top, right) contacts 90b which have remained closed, conductors 19 and 48 to the demagnetizing transformer 52, and contacts 54b in conductor 53 to the opposite lead 21.

The current through this demagnetizing circuit, as controlled by the rectifier 49 is thus in the direction of the arrow 44 as stated above and the value of the voltage imposed on the circuit is according to which one of the tappings 50 is connected with the conductor 48. As noted above the demagnetizing current is preferably substantially lower than the welding current and in the present instance may be on the order of 45 volts, the demagnetizing transformer 52 having the desired voltage range and tappings to that end.

Upon opening of the contacts 74c and consequent discharge of the condensers, the tube ceases to conduct, the interval in which it so ceases being according to the characteristics of he condensers and the setting of the adjustable resistor 80. In the present instance it may be on the order of a fraction of a second such for example as .3 or .4 of a second.

As used herein, the expression interval may be considered similar to difference, and includes difference in time, difference in condition of the working elements such as voltage and current, and difference in condition of the affected article (workpiece), as well as differences in possibly other factors and conditions.

Upon termination of the conduction of the tube 70, the relay coil 74a (center) is deenergized which permits contacts 74d (lower, right) to open and deenergize relay coil 54a, opening contacts 54c (upper, center) and 54b (upper, left). This terminates the demagnetizing step, the duration of which is controlled by the time cycle of the tube 70.

The demagnetizing effect takes place during one-half of each cycle of the AC as determined by the rectifier 49. The adjustable resistor 80 (bottom, left) is preset to effect complete demagnetization, and if necessary adjusted later to correct for greater accuracy.

The relay 98 (bottom, right), as stated above, is similar to the relay 86 (lower, right) in that it effects a time delay to complete its operation. Upon termination to that time delay, characteristic of the relay, it opens the contacts 98d (lower, right) in the conductor 84 and deenergizes the relay 86 and sets it up for the next cycle. Deenergization of the relay 86 permits the contacts 96d (bottom, right) to open, thus deenergizing the coil 98a.

The safety relay 60 (upper, right) remains energized during the welding operation, which opens the contacts 60b (center) and prevents any demagnetizing effect during the welding portion of the cycle. The voltage impressed on the workpiece during the demagnetizing portion of the cycle is that determined by the tapping 50 to which the conductor 48 is connected. Not only is this voltage considerably less than the line voltage utilized in the welding operation, but the value of that voltage can be selected according to which tapping 50 connection is made and thus great flexibility is provided to the operator in making adjustments both as to voltage utilized and the timing step to effect highly efficient demagnetizing.

It will be appreciated that greater accuracy in the demagnetizing action is realized by utilizing a lesser voltage than the line voltage, the actual voltage utilized being not in excess of that required for effective demagnetization.

Figure 3:
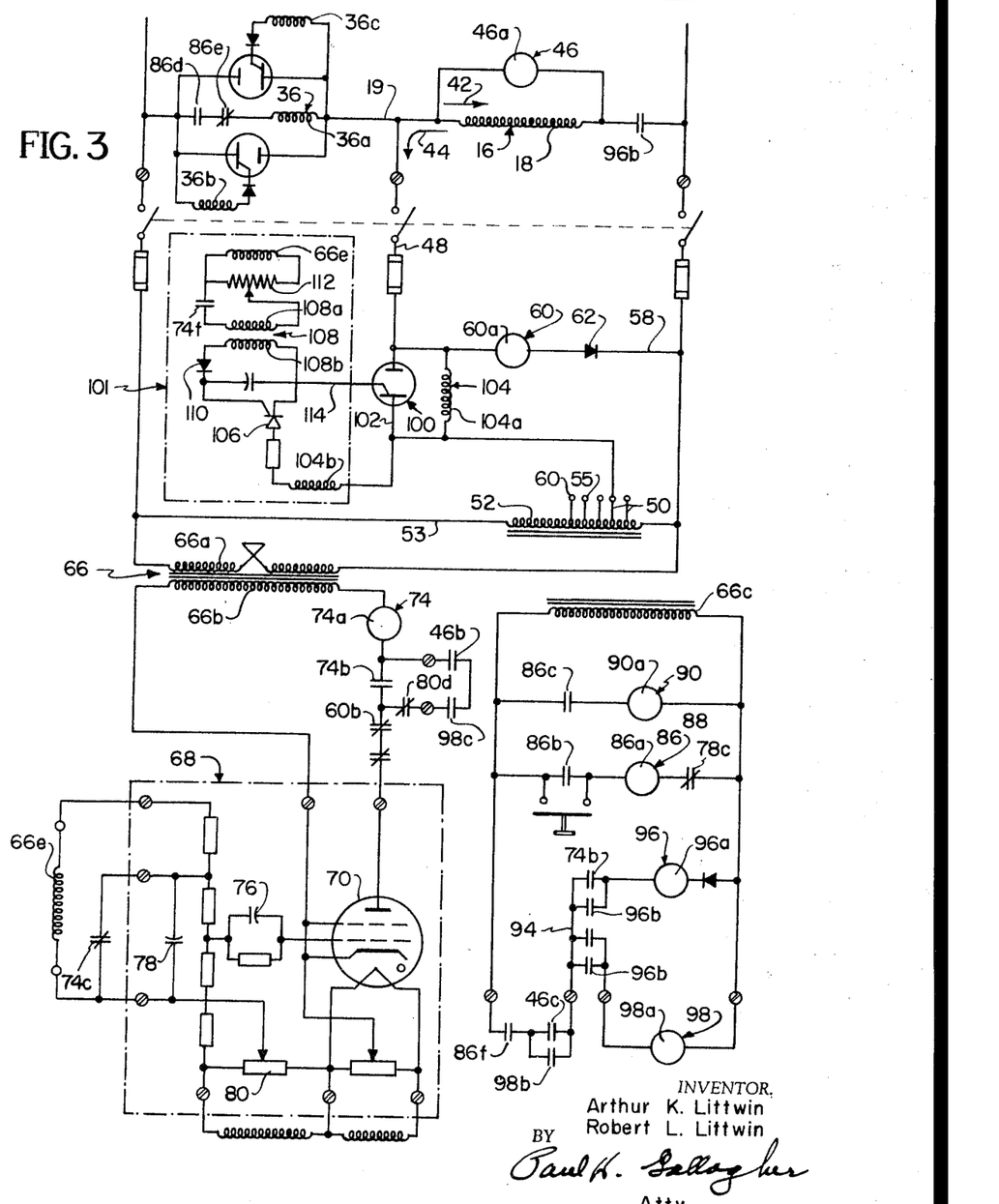
FIGURE 3 is a diagram of an electrical circuit of a second embodiment of the invention.

Reference is now made to FIGURE 3 showing another embodiment of the invention. The present embodiment utilizes a circuit generally similar to that of FIGURE 1 but instead of the rectifier 49 of FIGURE 1 (upper, center), and certain contacts and the control means therefor, an ignitron 100 is utilized. Those elements utilized in FIGURE 1 and eliminated from the present arrangement include contacts 54c (upper, center) and 54b (upper, left) together with the entire DC circuit (center, right). Additionally the transformer 64 (center, right) is eliminated, and a secondary of that transformer designated 64b in FIGURE 1 (lower, left) is in the present instance a secondary in the transformer 66 (center, left) and identified 66e (lower, left).

The ignitron 100 has its anode connected in the conductor 48 and its cathode connected with a conductor 102 which is connected with the selected tapping 50. A control indicated generally at 101 is associated with the ignitron; connected across the ignitron 100 is the primary 104a of a transformer 104 having a secondary 104b connected with the cathode of the ignitron in series with a gate 106 connected in circuit with the secondary 108b of a transformer 108. Also in series with the secondary 108b is a diode 110 arranged for imposing positive bias on the gate 106. The primary 108a is connected in series with an adjustable resistor 112 across which is a secondary 66e of the transformer 66 (center, left). Also in series with the primary 108a are contacts 74f controlled by the coil 74a (center) of the demagnetizing relay 74.

In the operation of the apparatus as represented in FIGURE 3, the secondary 66e remains constantly energized and upon closure of the contacts 74f pursuant to initiation of the demagnetizing cycle upon energization of the coil 74a, the transformer 108 becomes energized and positive current is imposed through the diode 110 on the gate 106. This permits current to flow from the secondary 104b through the gate and through another conductor 114 to the cathode of the ignitron. This ignites the ignitron and closes circuit therethrough and through the transformer 52 to perform the demagnetizing cycle as described above, the circuit being closed in this instance through the lead 20, conductor 19, conductor 48, the ignitron 100, conductor 102, the transformer 52, conductor 53, and the lead 21. The demagnetizing cycle in the present instance is terminated as before, upon the tube 70 (lower, center) becoming nonconducting, the coil 74a is deenergized opening contacts 74f, and the control including the ignitron 100 becomes nonconducting on the corresponding half-cycle of the AC. In the present instance as in the first embodiment, the demagnetizing effect takes place in the alternate half-cycle of the AC.

An important advantage of the present embodiment resides in the elimination of the mechanical contacts 54b and 54c with corresponding elimination of arcing and more accurate control in the demagnetizing action.

In the present case the value of the voltage utilized in the demagnetizing step is, as in the previous case, that determined by the particular tapping 50 connected in circiut. However the transformer 104 may be utilized for determining the voltage applied in the demagnetizing action, the voltage of this transformer being as great as that of the greatest value tapping 50 and substantially less than the line voltage.

Figure 4:
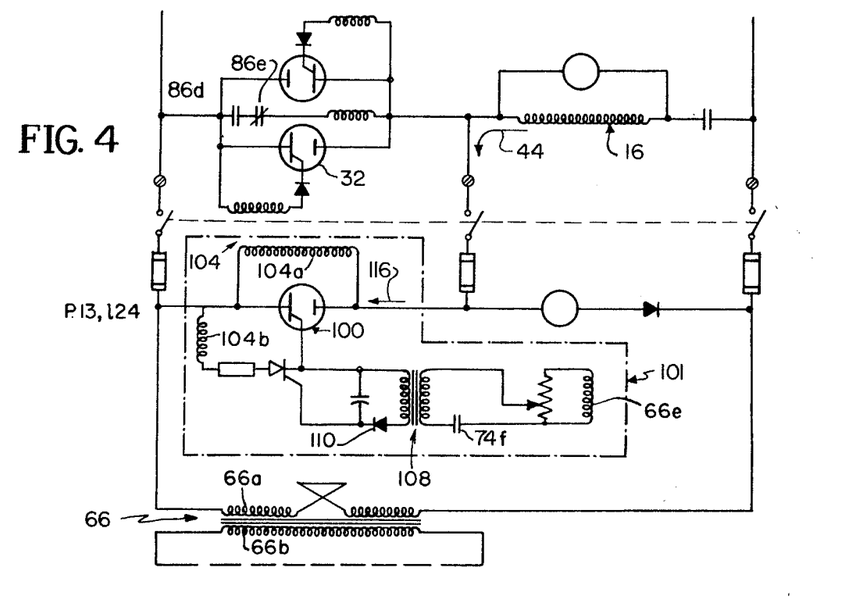
FIGURE 4 is a diagram of an electrical circuit showing a still further embodiment.

Attention is directed next to FIGURE 4. While in FIGURE 3 the ignitron 100 is utilized in conjunction with the transformer 52, that transformer is not essential, and the ignitron can be utilized in parallel with the leading ignitron 32 as shown in FIGURE 4. The circuit of FIGURE 4 is similar to that of FIGURE 3 but without the transformer 52 and with the demagnetizing ignitron 100 in parallel with leading ignitron 32. The circuit shown in FIGURE 4 is part of a larger circuit, the remainder being the same as the lower portion of FIGURE 3 below the transformer 66.

In the use of the apparatus of FIGURE 4 the demagnetizing step is controlled as to time in the same manner as described in connection with FIGURES 1 and 3 namely the transformer 104 remains constantly charged, as is the secondary 66e and upon closure of the contacts 74f, positive voltage is imposed on the gate 110, the ignitron 100 is ignited and rendered conducting and the demagnetizing current flows through the ignitron 100 in the direction of the arrows 44 and 116, the demagnetizing effect taking place in the corresponding half of each AC cycle.

Figure 5:
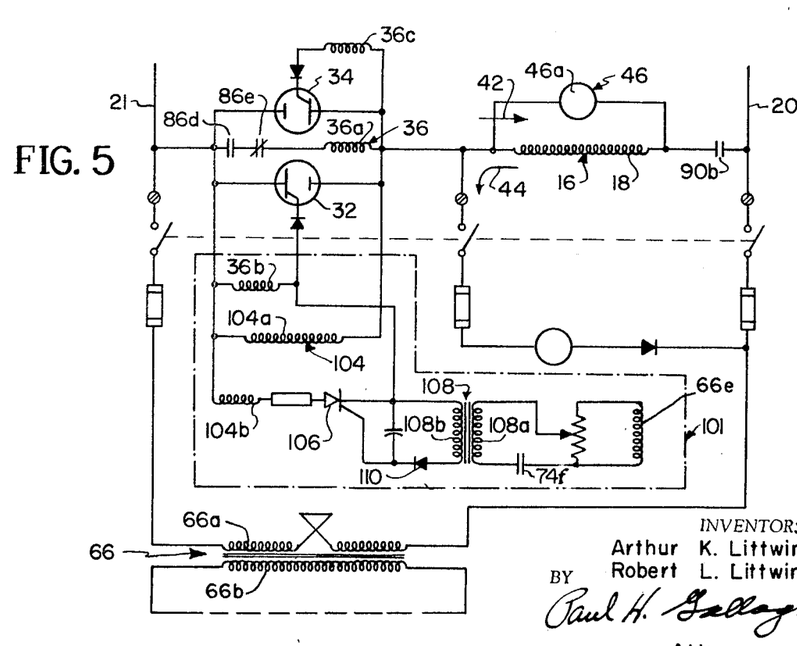
FIGURE 5 is a diagram of an electrical circuit showing still another embodiment.

FIGURE 5 shows an arrangement wherein instead of using a separate demagnetizing ignitron 100, the leading ignitron 32 can be utilized in the demagnetizing operation. FIGURE 5 is similar to FIGURE 4 in that the remainder of the apparatus represented in FIGURE 5 is the same as the portion below the transformer 66 in FIGURE 1. The control circuitry 101 associated with the demagnetizing ignitron 100 in FIGURES 3 and 4 is shown in FIGURE 5 applied to the leading ignitron 32. It is believed that further reference to this control circuit 101 need not be made here, as it will be seen that it is connected with the ignitron 32 in the same manner in which it is connected with the ignitron 100 in FIGURES 3 and 4. In the operation of the present device it will be seen that the transformer 104 remains energized, as does the secondary 66e, and upon closure of the relay contacts 74f the ignitron 32 is rendered conducting and the demagnetizing operation is performed as described above, under the control of the relay 74 (FIGURE 1, center).

In the apparatus of FIGURES 4 and 5 where the transformer 52 is eliminated, the voltage applied in the demagnetizing step is determined by the voltage developed in the transformer 104 which may be of any selected value such as 60 volts indicated at the transformer 52.

Figure 6:
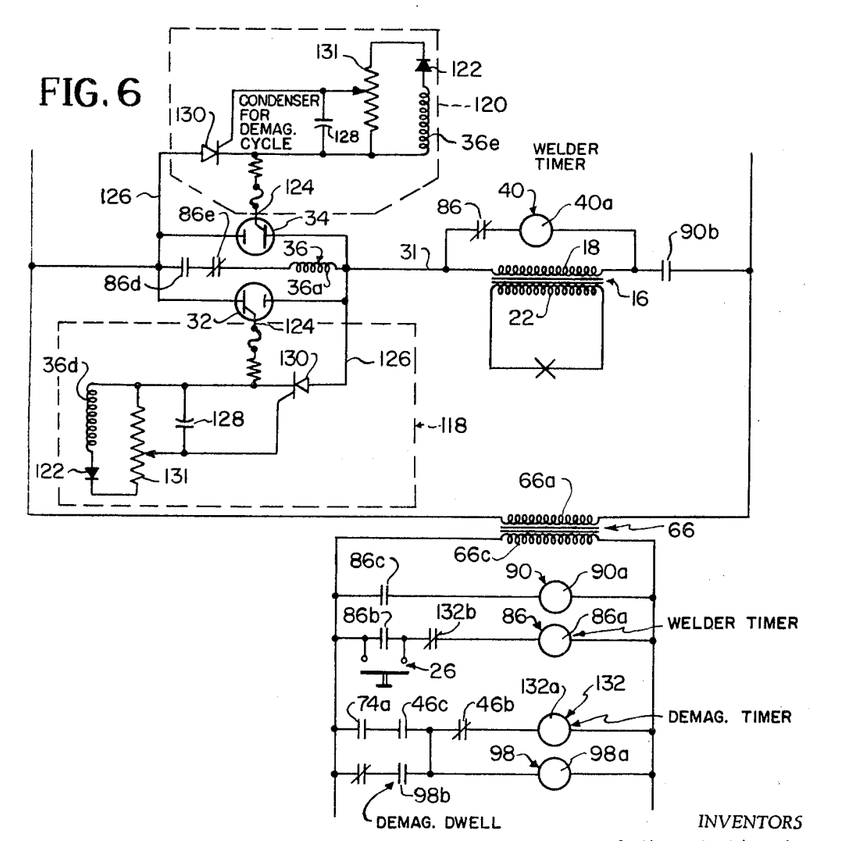
FIGURE 6 is a diagram of an electrical circuit of an additional embodiment of the invention.

The invention contemplates the use of both of the control ignitrons 32, 34 of the welder for controlling the demagnetizing operation. Such an arrangement is shown in FIGURE 6, where both halves of each AC cycle are utilized in the demagnetizing operation. This control incorporates means for timing the demagnetizing operation, eliminating the necessity for the demagnetizing timer stage 68 of the previous embodiments.

In FIGURE 6 each ignitron 32, 34 is provided with a control circuit indicated generally at 118, 120, these two being the same and reversed, corresponding to the ignitrons.

In the present case the ignitron control includes the transformer 36 as in the previous embodiments, parallel with the ignitrons and in series with the contacts 86d and 86e. The controls 118, 120 include secondaries, 36e in series with rectifiers 122, the ignitors 124, and conductors 126, the latter completing the circuit through the anodes of the ignitrons. A condenser 128 is connected across the secondary and rectifier 122 and between the ignitor 124 and conductor 126. A gate 130 is interposed in the conductor 126 which functions both in the welding and in the demagnetizing operation.

In the welding operation, when the contacts 86d, 86e and 90b are closed energizing the transformer 36, the secondaries 36d and 36e are constantly energized and in the corresponding half cycles the rectifiers 122 enable a positive bias to be placed on the gates 130, and enable flow of current through the conductors 126, the gates, and the ignitors to ignite the ignitrons. At the same time the condensers 128 become charged and then upon opening of the contacts 86e at the termination of the welding operation in the manner described above, the secondaries 36d and 36e become deenergized and the condensers begin their discharging action. The condensers are arranged so that positive bias is placed on the gates and in the corresponding half cycles they condition the gates for again enabling the flow of current through the conductors 126, the gates and the ignitors. The condensers as will be noted are arranged in back-to-back fashion with the ignitrons and in the corresponding halves of the cycles they condition the gates for the flow of current as stated.

As the charge on the condensers gradually dissipates, the gates are conditioned for progressively lesser time in each half cycle so that the flow of current through the conductors 126, the gates and the ignitrons, is for a shorter period in each half cycle whereby the ignitrons are fired for a lesser interval at each half cycle. The current imposed on the workpiece is gradually decreased, in both directions so that at the expiration of the discharge of the condensers, the workpiece is entirely demagnetized. The condensers are adjustable through the adjustable resistors 131 for predetermining the period of the demagnetizing step which may be as desired such as in the example given above namely .3 or .4 second, etc. The condensers themselves are of known kind and are capable of being adjusted relative to each other so as to dissipate their charges in substantially the same time period so that residual magnetism will not be imposed on the workpiece under control of one of the condensers after the other has been completely discharged. In this case also, the voltage imposed on the workpiece in the demagnetizing operation is substantially less than the line voltage and in this case also may be in the neighborhood of 50 to 60 volts, this being determined by the interval in each half cycle in which the ignitrons are conducting.

The overall cycle is terminated by the action of the timer-relay 132 opening the contacts 132b, which has a characteristic time delay action. This function together with others in the overall cycling control will be understood from the description above in connection with this phase of the apparatus.

It will be noted that in each of the embodiments of FIGURES 3–6, there are no mechanical contacts in the demagnetizing circuit, that circuit being energized through an ignitron, with consequent greater accuracy in control, and elimination of arcing.

While we have disclosed herein certain preferred forms of the invention, it will be understood changes may be made therein within the scope of the appended claims.

We claim:

1. Demagnetizing apparatus for use with electric welding apparatus utilizing AC and having electrodes operative for producing a welding operation on a workpiece and wherein the current in the electrodes produces magnetism in the workpiece and wherein at the instant of termination of the welding operation, the current flows through the workpiece in a predetermined direction, comprising in combination, apparatus for controlling the same AC so that it flows only in alternate half-cycles and produces a demagnetizing current through the workpiece and in a direction opposite that existing at the termination of the welding operation, and further controlling the demagnetizing current so that it is maintained at such value and impressed for such duration of time as to reduce the magnetism in the workpiece to a level near zero.

2. The invention set out in claim 1 wherein the demagnetizing apparatus utilizes said electrodes of the welding apparatus for introducing the demagnetizing current into the workpiece.

3. The invention set out in claim 1 wherein a demagnetizing timer circuit is utilized for controlling the application of the demagnetizing current, said demagnetizing timer circuit including an electron tube, condenser means operative for applying negative bias on the tube, means for charging the condenser means in the welding operation, means for terminating the welding operation and terminating charging of the condenser means whereby the condenser means becomes effective for rendering the tube nonconducting, and the tube thereby being effective for interrupting the demagnetizing timer circuit in the demagnetizing operation, and means for controlling the tube for adjustably predetermining the time period required for the condenser means to render it nonconducting.

4. Demagnetizing apparatus for use with welding apparatus having electrodes engageable with a workpiece for welding the workpiece, circuit means connected with a source of current for energizing the electrodes for performing a welding operation, said electrodes in the welding operation producing magnetization of the workpiece, means for interrupting the welding operation after a predetermined interval, said demagnetizing apparatus comprising, in combination, means for applying a current from said source to the workpiece in such direction, at such value, and for such length of time, as to substantially eliminate the magnetism in the workpiece, means automatically operative upon interruption of the welding apparatus for initiating operation of the demagnetizing apparatus, and means automatically operative for terminating operation of the demagnetizing apparatus upon demagnetization of the workpiece.

5. Apparatus of the character disclosed comprising a welding circuit adapted for connection with a source of current and including electrodes adapted for welding cooperation with the workpiece for performing a welding operation thereon, the electrodes producing magnetization of the workpiece in the welding operation thereon, means automatically operative for interrupting said welding circuit at the conclusion of the welding operation, a demagnetizing circuit operative for controlling flow of current through said main welding circuit to the workpiece at such value, in such direction, and for such interval of time, as to substantially demagnetize the workpiece, and means automatically operative for interrupting the demagnetizing circuit and the main welding circuit at the termination of the demagnetizing operation whereby to set up the circuits for a new cycle including the foregoing steps.

6. The invention set out in claim 5 wherein the apparatus is adapted for connection with an AC source, the welding circuit includes back-to-back ignitrons for controlling the flow of current, the ignitrons including a leading ignitron and a trailing ignitron, the means for shutting off the welding circuit being operative for so shutting it off in each instance when the current is flowing through the trailing ignitron whereby the workpiece becomes magnetized in every instance in the same direction, and the demagnetizing circuit is operative for applying current in the direction opposite that in which the current flowed at the instant of termination on the welding operation, and in the same half of each AC cycle.

7. The invention set out in claim 1 wherein the voltage applied in the demagnetizing operation is substantially less than that applied in the welding operation.

8. The invention set out in claim 7 wherein the voltage applied in the demagnetizing operation is on the order of a maximum of 60 volts.

9. The invention set out in claim 1 wherein the voltage applied in the demagnetizing operation is substantially less than that applied in the welding operation, and wherein transformer means is provided for producing the reduced voltage in the demagnetizing operation, the transformer means having a plurality of tappings whereby to connect the demagnetizing circuit therewith at different voltage points.

10. Apparatus of the character disclosed comprising, in combination, conveyor means for conveying a plurality of workpieces successively to a welding station, welding means having electrodes at the welding station operative for welding the workpieces by electric current, means for driving the conveyor means intermittently for positioning each workpiece successively at the welding station, means for bringing the electrodes into welding engagement with the workpiece at the welding station, means for applying current through the electrodes to the workpiece for performing the welding operation during a predetermined interval and terminating the flow of current at the end of that interval, the welding operation producing magnetism in the workpieces, and demagnetizing apparatus operative for demagnetizing each workpiece after the welding operation thereon, means for automatically terminating the demagnetizing operation after a predetermined interval, and means automatically operative for defining a predetermined overall cycle including the foregoing steps and repeating that cycle.

11. Demagnetizing apparatus for use in connection with apparatus for welding a workpiece and having a transformer including a primary, circuit means including said primary and including the workpiece in the welding operation, back-to-back ignitrons in said circuit for controlling said primary, means for energizing the ignitrons, and means for opening said circuit for terminating a welding operation wherein the current through the primary and the workpiece flows in the same direction at the instant of shut off as determined by the same one of said ignitrons, said demagnetizing apparatus comprising circuit means also including said primary and the workpiece and including rectifier means enabling flow of current through said primary and through the workpiece in direction opposite that in which it flowed at the instant of termination of the welding operation, a transformer having a plurality of tappings enabling connection of the welding transformer therewith selectively at different voltages, means energizing the demagnetizing circuit in response to shutting off the welding circuit, and means for shutting off the demagnetizing circuit after a predetermined interval including tube means and adjustable means for imposing negative bias on the tube means as developed in the magnetizing step for rendering the latter nonconducting.

12. The invention set out in claim 11 wherein the rectifier means in the demagnetizing circuit includes a solid state rectifier, and the means for energizing the demagnetizing circuit includes relay means controlled by the tube means, the relay means having contacts in series with the demagnetizing transformer.

13. The invention set out in claim 11 wherein the rectifier means in the demagnetizing circuit is an ignitron, a control circuit is provided for the ignitron, and means is provided for controlling the control circuit which includes a relay controlled by the tube means, the relay having contacts in the control circuit for the ignitron.

14. Demagnetizing apparatus for use with apparatus for welding a workpiece and having a transformer including a primary, circuit means adapted for connection with an AC source including said welding primary and the workpiece in the welding operation, control means in said circuit means for controlling the welding primary including means operative for automatically opening the welding circuit after a predetermined interval and thus terminating a welding operation, said demagnetizing apparatus comprising a demagnetizing circuit also including said welding primary and including rectifier means in series with the welding primary, said rectifier means being constituted by ignitron means, means for energizing said demagnetizing circuit and operative for automatically opening that circuit after a predetermined interval for demagnetizing an article by means of current flowing through said welding primary, and operative means for automatically opening said demagnetizing circuit after a predetermined interval.

15. The invention set out in claim 14 wherein the demagnetizing circuit includes a transformer having a plurality of tappings for connection in the circuit selectively at different voltages.

16. Apparatus of the character disclosed comprising, in combination, a welding circuit adapted for connection with an AC source and including a welding transformer primary and control means for that primary, the welding circuit also including a workpiece in a welding operation, the control means including back-to-back ignitrons one of which is a leading ignitron and the other a trailing ignitron, means for closing said welding circuit for performing a welding operation and for opening that circuit after a predetermined interval for terminating the welding operation, the welding operation being terminated in every instance in which the flow of current is in the same direction through said primary and through the workpiece as controlled by said trailing ignitron, a demagnetizing circuit including said welding primary and the workpiece and an ignitron in series with that primary and parallel with said leading ignitron, and means for controlling the demagnetizing ignitron including a control transformer having a primary in parallel with that ignitron and a secondary in an igniting circuit of that ignitron, means for normally holding said last circuit de-energized, control means for energizing said last circuit for thereby igniting the demagnetizing ignitron and energizing the demagnetizing circuit, and means for again de-energizing the ignitor circuit for extinguishing the demagnetizing ignitron and thus the demagnetizing circuit after a predetermined interval upon demagnetization of an article magnetized by the welding operation.

17. The invention set out in claim 16 wherein the demagnetizing ignitron is the only normal control element in the demagnetizing circuit in series with the welding primary.

18. The invention set out in claim 16 wherein the demagnetizing ignitron is constituted by a single ignitron and is operative for applying unidirectional current in the demagnetizing operation.

19. Apparatus of the character disclosed comprising in combination a welding circuit adapted for connection with an AC source and including a welding transformer primary and control means therefor in series therewith, the welding circuit also including a workpiece in the welding operation, said control means including back-to-back ignitrons one of which is a leading ignitron and the other a trailing ignitron, means for closing said welding circuit for performing a welding operation and thereafter opening the circuit at the termination of a predetermined interval, said last means in being operative for interrupting said circuit each time while the current is flowing through the welding transformer and through the workpiece in the same direction as determined by said trailing ignitron, and demagnetizing control means connected with said leading ignitron for energizing that ignitron and thereby closing said welding circuit, said demagnetizing control means including an ignitor circuit for igniting said leading ignitron, means normally maintaining said ignitor circuit deenergized, a demagnetizing circuit operative for energizing said ignitor circuit, and means for controlling the demagnetizing circuit and energizing the ignitor circuit upon termination of a predetermined welding interval and again deenergizing said ignitor circuit after a predetermined demagnetizing interval.

20. The invention set out in claim 19 wherein the welding circuit is energized by the leading ignitron and is thereby utilized for the demagnetizing operation through said welding transformer.

21. Apparatus of the character disclosed comprising, in combination, a welding circuit adapted for connection with an AC source and including a welding transformer primary and energizing means therefor, the welding circuit also including a workpiece in the welding operation, said energizing means including back-to-back ignitrons one of which is a leading ignitron and the other a trailing ignitron, control means for energizing the ignitrons in corresponding half-cycles of the AC for energizing the welding circuit and performing a welding operation on the workpiece, the welding operation incidentally causing magnetism of the workpiece, said control means being operative for deenergizing said welding circuit at the expiration of a predetermined interval, and demagnetizing control means for igniting said ignitrons and thereby energizing the welding circuit for performing a demagnetizing operation on the workpiece, said last control means being operative for interrupting the circuit at the expiration of a predetermined demagnetizing interval.

22. The invention set out in claim 21 wherein said demagnetizing control means is operative for establishing a voltage in the demagnetizing operation substantially less than the voltage in the welding operation.

23. The invention set out in claim 21 wherein the demagnetizing control means for the ignitrons include condensers charged by the welding circuit in the welding operation and the demagnetizing circuit is effective for enabling the condensers to discharge in the demagnetizing operation and thereby utilize the welding circuit for igniting the ignitrons throughout the interval of discharge thereof.

24. The invention set out in claim 23 wherein means is provided for adjusting the demagnetizing control means for adjustably charging said condensers to selectively different charges.

25. The invention set out in claim 24 wherein the demagnetizing control means for the ignitrons includes transformer means operative when energized for igniting the ignitrons, gate means is provided for controlling said transformer means, and the condensers are utilized for controlling the gate means for correspondingly enabling ignition of the ignitrons.

26. Welding and demagnetizing means comprising, in combination, welding electrodes, a transformer having a secondary connected with said electrodes, a circuit adapted for connection with an AC source and including the primary of said transformer and also including a pair of back-to-back ignitrons one of which is a leading ignitron and other a trailing ignitron, welding control means for igniting said ignitrons and thereby energizing said welding circuit throughout a predetermined interval for performing a welding operation by the electrodes on a workpiece, the welding operation causing incidental magnetization of the workpiece, demagnetizing control means operative for igniting both said ignitrons and thereby energizing the welding circuit and utilizing the electrodes for performing a demagnetizing operation on the workpiece, and means for controlling both the welding and demagnetizing control means for establishing an overall cycle in a first portion of which the welding operation is performed and a second portion of which a demagnetizing operation is performed, the demagnetizing operation persisting until the magnetism of the workpiece reaches substantially zero.

27. A method of welding a workpiece in conjunction with electrodes applied to the workpiece for passing current therethrough, comprising the steps imposing current through the electrodes on the workpiece until the workpiece is welded, the welding operation having the incidental effect of magnetizing the workpiece, then imposing a demagnetizing current through the electrodes on the workpiece in such direction and for such interval as to reduce the magnetism of the workpiece to zero.

28. A method of welding a plurality of workpieces in conjunction with electrodes, comprising, moving a workpiece into a welding station, applying the electrodes to the workpiece, impressing a welding current through the electrodes on the workpiece throughout a predetermined interval and thereby performing a welding operation having the incidental effect of magnetizing the workpiece, and after termination of the welding operation, impressing a demagnetizing current through the electrodes on the workpiece throughout a predetermined interval and thereby demagnetizing the workpiece, and repeating the foregoing steps with each of the workpieces in successive ones of a plurality of like cycles.

29. A method of demagnetizing a workpiece that is welded by a welding apparatus having electrodes engaging the workpiece and in which AC is utilized in the welding operation, and in the welding operation the workpiece is incidentally magnetized, which comprises the steps of terminating the welding operation and applying unidirectional demagnetizing current to the workpiece through the electrodes until the magnetism of the workpiece is substantially eliminated.

30. A method of demagnetizing a workpiece that is welded by a welding apparatus having electrodes engaging the workpiece, and in the welding of which it is incidentally magnetized, which comprises the steps of terminating the welding operation and applying demagnetizing AC to the workpiece through the electrodes until the magnetism of the workpiece is substantially eliminated.

31. The method set out in claim 30 wherein both the welding current and the demagnetizing current are AC.

References Cited

UNITED STATES PATENTS

| 1,999,617 | 4/1935 | Randall | 219—103 |
| 2,477,622 | 8/1949 | Klemperer | 219—113 |
| 2,508,115 | 5/1950 | Klemperer | 219—113 |
| 2,294,388 | 9/1942 | Dawson | 317—157.5 |

RICHARD M. WOOD, *Primary Examiner.*

P. W. MAY, *Assistant Examiner.*

U.S. Cl. X.R.

219—86, 110